(12) United States Patent
Steinmaier et al.

(10) Patent No.: US 7,937,410 B2
(45) Date of Patent: May 3, 2011

(54) GENERIC ARCHIVING OF ENTERPRISE SERVICE ORIENTED ARCHITECTURE DATA

(75) Inventors: Carola Steinmaier, Dossenheim (DE); Marcus Pfeifer, Mannheim (DE)

(73) Assignee: SAP AG, Walldorf (DE)

( * ) Notice: Subject to any disclaimer, the term of this patent is extended or adjusted under 35 U.S.C. 154(b) by 363 days.

(21) Appl. No.: 11/960,595

(22) Filed: Dec. 19, 2007

(65) Prior Publication Data

US 2009/0164497 A1    Jun. 25, 2009

(51) Int. Cl.
*G06F 17/30* (2006.01)
(52) U.S. Cl. .................. 707/802; 707/803; 707/804
(58) Field of Classification Search .................. 107/1, 2, 107/100, 102, 103 R, 200, 802, 803, 804
See application file for complete search history.

(56) References Cited

U.S. PATENT DOCUMENTS

| | | | |
|---|---|---|---|
| 7,185,024 B2 * | 2/2007 | Zhou et al. | 707/104.1 |
| 7,313,561 B2 * | 12/2007 | Lo et al. | 1/1 |

* cited by examiner

*Primary Examiner* — Hung Q Pham
(74) *Attorney, Agent, or Firm* — Mintz, Levin, Cohn, Ferris, Glovsky and Popeo PC (57) ABSTRACT

Methods and apparatus, including computer program products, for generic archiving of enterprise service oriented architecture data. In general, an identification of an instance of a business object to archive is received. Information defining the business object is retrieved. A schema for the type definition and a definition of the instances of the business object in accordance with the schema is generated. The schema may be in accordance with a platform-independent file format including information reflecting the hierarchy of the business object. The schema may include hierarchy levels that reflect each hierarchy level of the business object. Each hierarchy level, with the exception of hierarchy levels including references to stand-alone business objects, may have the respective attributes of the hierarchy level of the business object. Instance data may be generated to reflect the instance of the business object, the instance data being in accordance with the schema.

18 Claims, 5 Drawing Sheets

```
       xsd:schema
402 {  <element name= „ArchiveBO">
       <xs:sequence>
          ⎧ <xsd:element name = „NodeID">
    404 ⎨ <xsd:element name = „Node1"
          ⎩   type „Node1Type">
                        ...
          ⎧ <xsd:element name = „Association1"
          ⎪     min occurs = 1....>
          ⎪     <xs:sequence>
    404 ⎨         <xsd:element name = „ParentNode">
          ⎪         <xsd:element name = „NodeID">
          ⎪         <xsd:element name = „Node2"
          ⎩            type „Node2Type">
                        ...
          <xs:sequence>
       </xsd:element>
       <xs:sequence>
       </xsd:element>
```

GENERIC ARCHIVING OF ENTERPRISE SERVICE ORIENTED ARCHITECTURE DATA

BACKGROUND

The present disclosure relates to data processing by means of a digital computer, and more particularly to generic archiving of enterprise service oriented architecture data.

In general, enterprise systems may operate at an application platform-level by having business objects describe a structure and behavior of real-world objects. A business object may include a hierarchy of business object nodes, which represent data as attributes; may be an independently viable entity with identifiable instances; may bundle functions and data, both of which may be accessible from outside of the business object; may be described by a data model, an internal process model, and one or more service interfaces; and may be a core structuring element of applications that are centrally defined by a developer as part of an overall governance process.

Business objects may be stored in database data structures, such as tables and indexes.

SUMMARY

The subject matter disclosed herein provides methods and apparatus, including computer program products, that implement techniques related to generic archiving of enterprise service oriented architecture data.

In general, an identification of an instance of a business object to archive is received. A search is performed for information defining the business object in an enterprise service repository. A schema for the type definition and a definition of the instances of the business object in accordance with the schema is generated. The schema is in accordance with a platform-independent file format including information reflecting the hierarchy of the business object. Generating the schema and the definition includes generating in the schema hierarchy levels to reflect each hierarchy level of the business object. Each hierarchy level, with the exception of hierarchy levels including references to stand-alone business objects, is to have the respective attributes of the hierarchy level of the business object and the format of generating in the schema hierarchy levels is the same for other business objects of a same data type. Instance data is generated to reflect the instance of the business object, the instance data being in accordance with the schema.

The subject matter may be implemented as, for example, computer program products (e.g., as source code or compiled code tangibly embodied in computer-readable media), computer-implemented methods, and systems.

Variations may include one or more of the following features.

Instances of a business object may be reconstructed based on the instance data and the schema.

A retrieve of associated nodes of the business object instance may be performed based on the reconstructed instance of the business object by a generic coded service for retrieving nodes of different data types.

The schema and instance data may be formatted in accordance with eXtensible Markup Language.

A request to archive additional business object instances of the same business object type as instances represented by the instance data may be received. In response to the request, if the additional business object instances are of a new version of the business object type, a new schema may be generated; otherwise, a new schema might not be generated to accompany additional instance data.

Generating a schema and instance data may include a node identifier of a standalone business object but not attributes of the standalone business object if the standalone business object is an associated node of the business object.

Generating a schema and instance data may include including attributes of non-standalone business objects in both the schema and the instance data.

Information defining a business object may include data type definitions of nodes of the business object and a definition of relationships among the nodes of the business object.

Searching for information defining a business object in an enterprise service repository may include providing requests for the information defining the business object in accordance with a common language to define access to business objects through an enterprise services framework.

The subject matter described herein can be implemented to realize one or more of the following advantages. Archiving and restoring from an archive may be performed in a generic fashion, without regard to representation of a business object in the software itself (e.g., a specific database definition); thus, no special coding may be required for different versions or types of business objects (e.g., for services using the objects) and the objects may be easily reconstructed by other applications (e.g., need not have to have a specific version of the program around). Also, the generic fashion may allow for support to work with both online and archive data at the same time without showing any distinction (e.g., for reporting). As the data may be archived to XML or a similarly-adopted format, an XML schema may serves as a basis for the further processing of archived data using tools that support XML, such as ADOBE forms.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
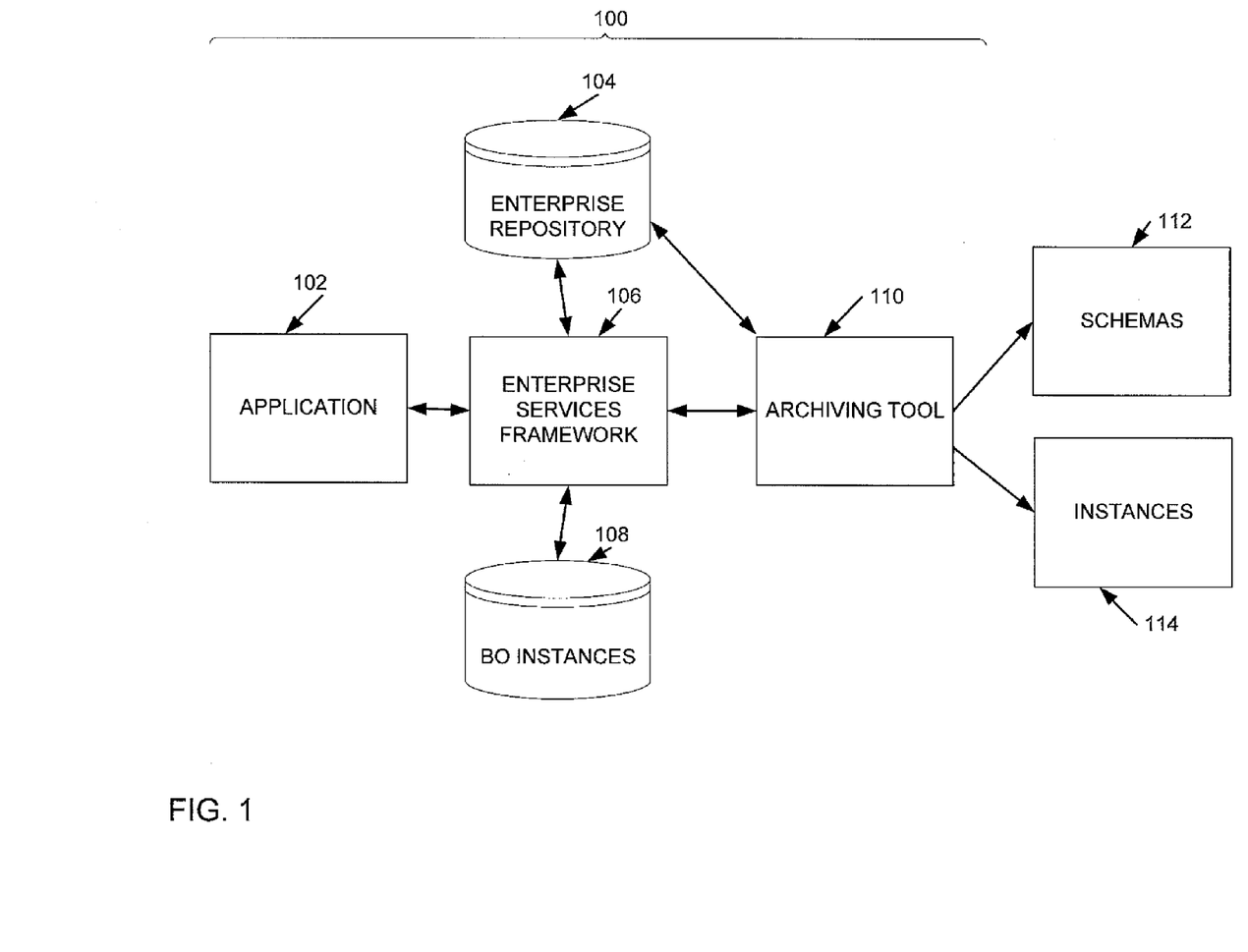
FIG. 1 is a block diagram of a system to generate archive data for business object data of an enterprise system.

FIG. 1 is a block diagram of a system to generate archive data for business object data of an enterprise system. The system 100 includes an application 102, an enterprise repository (ER) 104, an enterprise services framework (ESF) 106, a storage of business object (BO) instances 108, and an archiving tool 110, which may be used to generate schemas 112 and instances 114.

In general, operation of the system 100 may be as follows. The application 102 may be used to request an archiving of selected business object instances. The request may be forwarded to the ESF 106, which may contact the archiving tool 110 and request archiving of the selected business object instances. The archiving tool 110 may request copies of the business object instances from the ESF 106, which may in turn query the storage of business object instances 108 for copies of the selected business object instances. The archiving tool 110 may determine data types of business objects to be archived and the data types of their nodes based on the selected business object instances and may request definitions of data models of the data types of their nodes and the relationships between nodes from the enterprise repository 104, which may be received in response to the request. Based on the data models of the nodes and definitions of relationships among nodes of a business object data type, the archiving tool 110 may generate one or more schemas 112, with a cardinality of one schema per a business object data type. Also, the archiving tool 110 may generate instances 114 of the selected business object instances that contain data in accordance with the schemas.

The schemas 112 and the instances 114 may be used together to retrieve archived versions of the selected business object instances. The selected business object instances at the storage of business object instances 108 may be deleted in response to the archiving of the selected business object instances.

When searches of data are performed, the archived business objects represented by the schemas 112 and instances 114 may be automatically included in search results, where the ESF 106 may work with the archiving tool 110 to reconstruct and search archived business object instances and the process of searching and returning results to a user may be seamless. To assist with searching of archived business objects, the ESF 106 may support selected core services of archived business objects, such as a retrieve, which may return a business object node instance, and retrieve by association, which may return a business object node instance of an associated node.

As an example of how a search may be performed, a user may enter query criteria in the application 102 where the criteria may include selection criteria for one or more types of business objects and the user may request the query to be performed, in response to which the ESF 106 may receive the request. The ESF 106 may search the storage of BO instances 108 for non-archived instances of business object data and may request a search of the archived business object data from the archiving tool 110. The archiving tool 110 may generate in-memory instances of the types of business objects included in the selection criteria (e.g., in-memory instances of all SalesOrder business object instances may be generated) and perform a query on those instances or send the in-memory instances of the business objects to the ESF 106. Results of the archived and non-archived business object instances that match the query may be combined by the ESF 106 and returned to the application 102.

The application 102 may be any type of application that uses the ESF 106. The application 102 may be a client/server application where a client application requests services of a server application, which may be the application 102. The application 102 may provide for user input but need not include a user interface. For example, another application may interface with the application 102 through an application programming interface (API). Although only one application is shown, there may be any number of applications that interface with the ESF.

The ER 104 is a central repository about enterprise information for an enterprise system landscape and may be an Enterprise Services Repository (ESR), which may act as a central information repository about enterprise services in enterprise service-oriented architecture ecosystem. Metadata inside the ER 104 may be used by development tools, modeling tools, operational management tools, and by other services to help them do their jobs. For example, the ER 104 stores definitions of data types of nodes of business objects and definitions of relationships among nodes for a data type of a business object for an enterprise landscape that may be requested by the archiving tool 110. The definitions of nodes and their relationships for business objects may be definitions in the form of a schemas such that the archiving tool 110 may generate a new schema from definitions retrieved from the ER 104 by combining schemas of data types of nodes based on the relationships of nodes (e.g., the archiving tool may copy schemas of nodes from the ER 104 and organize them according to the relationships of nodes in a business object data type (e.g., based on a level in a hierarchy and an association between nodes, such as an association to indicate a node is a node of a standalone business object) to generate one of the schemas 112). In some implementations, entire schemas of business objects may be stored in the ER 104 such that the archiving tool 110 need not generate a new schema from definitions retrieved from the ER 104. The definitions of data types of nodes of business objects and relationships among nodes in the ER 104 may be in a format that requires transformation to a schema that is to be archived (e.g., transformation from a proprietary format to an XML format).

The ESF 106 is provides a service-oriented infrastructure that allows for separating and isolating business logic within application architectures in a manner that allows reuse of the business logic within various situations in a flexible and easy-to-build way. The ESF 106 allows clients to consume services provided by a server-side generic class, the service manager. A service framework, such as the ESF 106, may include computer hardware, computer networks, user interfaces, support programs, code libraries, code repositories, scripting language, or other components to help develop and glue together the different components of one or more software systems or applications. The service entity provider allows the instantiation of business objects in response to the API call.

The storage of BO instances 108 is a data structure, such as a database table or set of tables, that includes data representing instances of business objects. In general, a business object model defines the business objects in the system 100 to include a set of business object data types, which may change over time. Each business object data type has its own definition of a hierarchy of nodes and attributes of nodes. Values of instances of business objects are defined in the storage of BO instances 108. Instances of business objects in the storage of BO instances 108 may be interacted with through the ESF 106. For example, an application may call a service of a business object instance through the ESF 106.

The archiving tool 110, as discussed above, provides archival of business object instances. To do so, the archiving tool 110 generates both schemas for a business object data type and data representing instances 114 of the business object data types. As discussed above, a schema for a business object data type may be generated by requesting definitions of business object node data types and definitions of relationships among nodes of a business object data type, transforming the definitions if needed, and combining the definitions to generate a schema to represent an entire business object data type. FIG. 4 includes a description of an example schema and FIG. 3 includes a description of example business object instance data. In addition to assisting with archiving, the archiving tool 110 may assist with reconstructing business objects from archives and providing services for archived business objects (e.g., a core service retrieve for all archived business objects).

The schemas 112 and instances 114 are written to a file in accordance with a platform-independent format that preserves a hierarchy of information contained in a business object instance, such as an eXtensible Markup Language (XML) format, where the instances 114 includes a tree-structured, hierarchical view of data in accordance with a corresponding schema in the schemas 114. Thus, for example, for a SalesOrder business object data type there may be one schema or a version of a schema corresponding to the SalesOrder business object data type and multiple instances of the data type formatted in accordance with the schema. Not all information of a business object instance may be stored in the instances 114. For example, to avoid repetitive data, all information except data representing transformation nodes (e.g., nodes that represent a transformation of data included in other nodes) and associated, standalone nodes (e.g., nodes that are associated with a business object by reference (e.g., some child nodes) and may otherwise be archived according to their own schema) may be included in an archived instance of a business object. As XML or a similar format may be used, and the schemas 112 in combination with the instances 114 may include all information necessary to reconstruct the data in business object instances, archived business object instances may be platform and application independent, and not in a proprietary format such that any application may be easily configured to reconstruct business object instances. This may be important for applications such as reporting for legal reasons, where, for example, data may need to be retained for thirty years and application programs may change over time (e.g., reach an end-of-life-scenario where the access and interpretation of business data must be guaranteed after a final shutdown of the system) such that an independence of archived business object instances from application programs may allow for easy retrieval of business object data.

An example of nodes that may be included in an archival instance of a business object may include all nodes that can be obtained via associations of composition and is not a transformation node or a standalone dependent node. For standalone dependent nodes, node identifiers or root identifiers of the node or its business object may be included in an archived instance of a business object. As an example of composition, composition may refer to nodes having a strong parent child association such that the child instance existence is dependent. Associations for associated nodes that are not compositions may include intra-BO associations that express an association from a source to a target node where source and target are both part of the same BO; text associations that express a link from a parent node to a language dependent child node with a predefined filter criteria consisting of the language code; cross-BO associations that express an association from a source to a target node where source and target node belong to different BOs; and a dependent object composition relationship association that expresses a composition from a parent node in a so-called hosting BO to a child node being the root of a dependent object—by this dependent object composition the model structure of the dependent object gets embedded into the model structure of the hosting BO on the parent instance and a child has precisely one parent.

Figure 2:
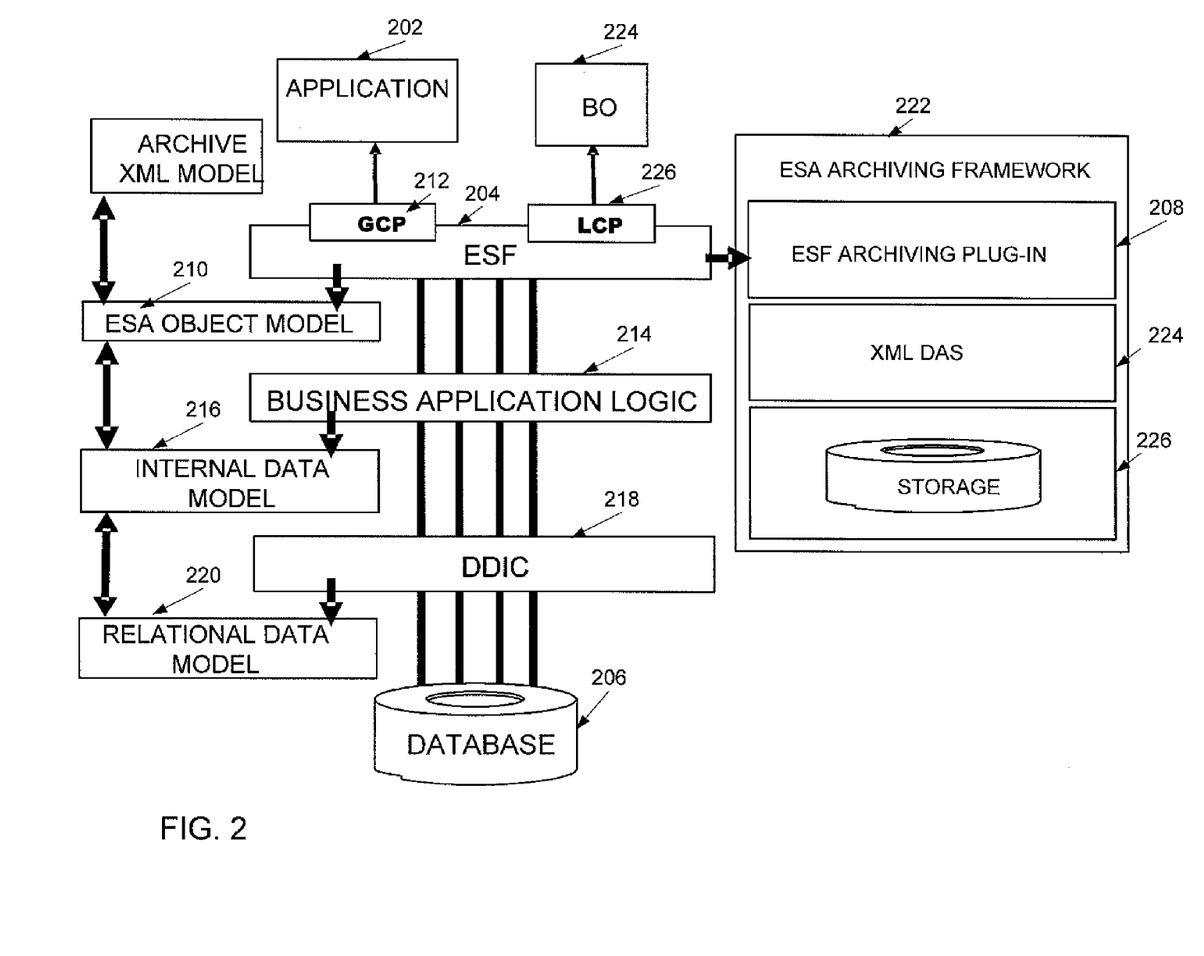
FIG. 2 is a block diagram of a system to generate archive data for business object data of an enterprise system.

FIG. 2 is a block diagram of a system to generate archive data for business object data of an enterprise system. In general, the system of FIG. 2 is a detailed implementation of the system of FIG. 1. Components of the system of FIG. 2 may perform functions similar to components of the system of FIG. 1. In particular, the application 202 of FIG. 2 may perform functions of the application 102 of FIG. 1, the ESF 204 of FIG. 2 may perform functions of the ESF 106 of FIG. 1, the database 206 of FIG. 2 may perform functions similar to the storage of BO instances 108, the ESF archiving plug-in 208 of FIG. 2 may perform functions similar to the archiving tool 110 of FIG. 1, and the ESA (Enterprise. Services Architecture) object model 210 of FIG. 2 may perform functions similar to the ER 104 of FIG. 1.

In general, components of the system of FIG. 2 may operate as follows. The application 202 may interface with the ESF 204 through a GCP (generic client proxy) 212. The GCP may provide an interface based on an ESF definition such that a pattern can generically connect to any backend application of the ESF, such as the archiving plug-in 208.

The ESF 204 may allow for access to objects from heterogeneous data sources in accordance with a common meta model of business objects described by the ESA object model 210. To access the data sources, the ESF 204 may use the business application logic 214 in combination with an internal data model 216 (e.g., a model other than a model used for business objects) to describe data representing business objects. Then, the business application logic 214 may use the DDIC (data dictionary) 218 in combination with a relational data model 220 to retrieve data representing the internal data model in accordance with the relational data model 220. The DDIC 218 may centrally describe and manage all the data definitions used in the system. Then, the DDIC 218 may return relational data representing business objects stored in the database 206 up the chain of models from the relational data model 220 to the internal data model 216 to the ESA object model 210.

The ESF 204 may be a central tool of an enterprise landscape for communicating to and from business objects. For example, for an application to communicate with a BO (e.g., a SalesOrder BO), the application may communicate with the ESF 204, the ESF 204 may communicate with the BO, and the ESF 204 may pass back an answer of the BO to the application. To communicate with the ESF 204, ESF 204 provides several interfaces or languages, including the languages GCP and LCP, which may be nearly the same. GCP 212 may be used to talk to the application 202, which may include a user interface, whereas LCP 226 may be used for BOs to talk to each other (e.g., to communicate from a BO 224 of another system to a BO represented in the database 206). For example, when a Purchase Order BO needs information from a Sales Order BO, LCP 226 may be used.

Advantageously, the ESF 204 provides a "common language" to talk to BOs through the ESF 204 (e.g., the LCP 226 or GCP 212, of which the ESA archiving plug-in 208 may use LCP, or another language). The ESA archiving plug-in 208 may use this language to communicate with the ESF 204 such that direct communication between the archiving plug-in 208 and BOs is not required. Thus, for a BO there is no need to implement special features or special adaptations for data archiving, and the ESA archiving plug-in 208 may have generic support for any type of BO data type defined by generic constraints of a BO implementation (e.g., having defined relationships among nodes that fit within an overall BO model for defining BOs). In this fashion, the approach of the ESA archiving plug-in to archive data and retrieved archived data may be considered model driven so as to not require additional coding for support of some BO services (e.g., retrieve and retrieve by association) by the ESF 204. For example, if the archiving plug-in 208 communicates with the ESF 204 through LCP, and is able to determine the model of the business object of a BO through an enterprise repository, the archiving plug-in 208 may talk to all BOs and read out information for each and every instance of a BO without requiring specific coding in a BO.

The ESA archiving framework 222 includes an ESF archiving plug-in 208, an XML DAS (data archiving services) 224, and a storage 226. A division of tasks among the components of the ESA archiving framework 222 may be as follows. The ESF archiving plug-in may handle requests to archive business object instances, handle requests to retrieve archived business object instances, and may request information defining business object data types from the ESA object model 210. The XML DAS 224 may perform transformation of business object models from an in-memory representation to and from an XML representation, which may include generating XML schemas of business object data types and generating XML data representing instances of business objects. In addition, the XML DAS 224 may validate XML instances of business objects against XML schemas. The storage 226 may store XML schemas of business object data types of XML data representing instances of business objects.

Figure 3:
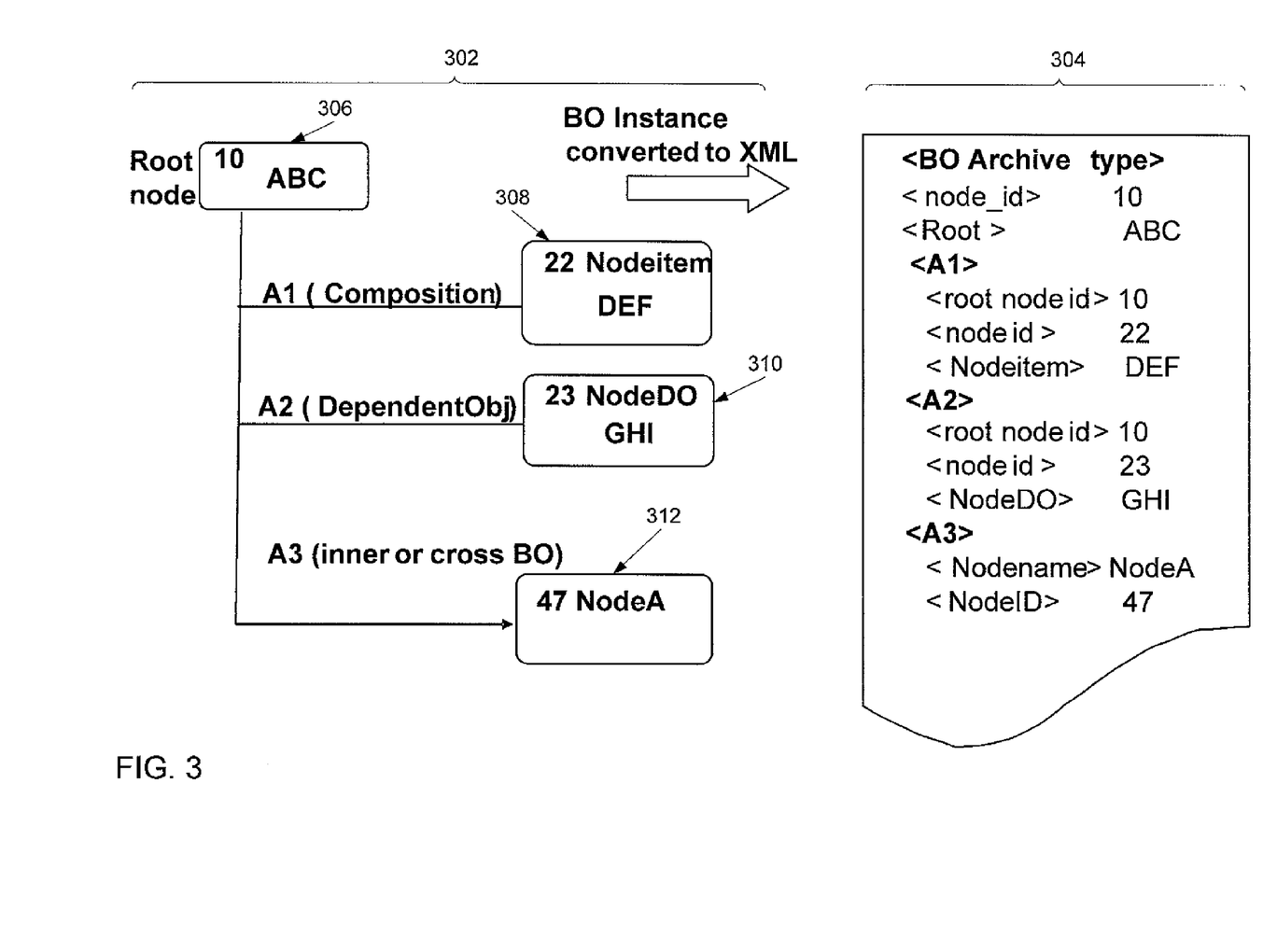
FIG. 3 is a diagram of a tree structure representing a business object instance and an XML (eXtensible Markup Language) document representing the business object instance.
Figure 4:
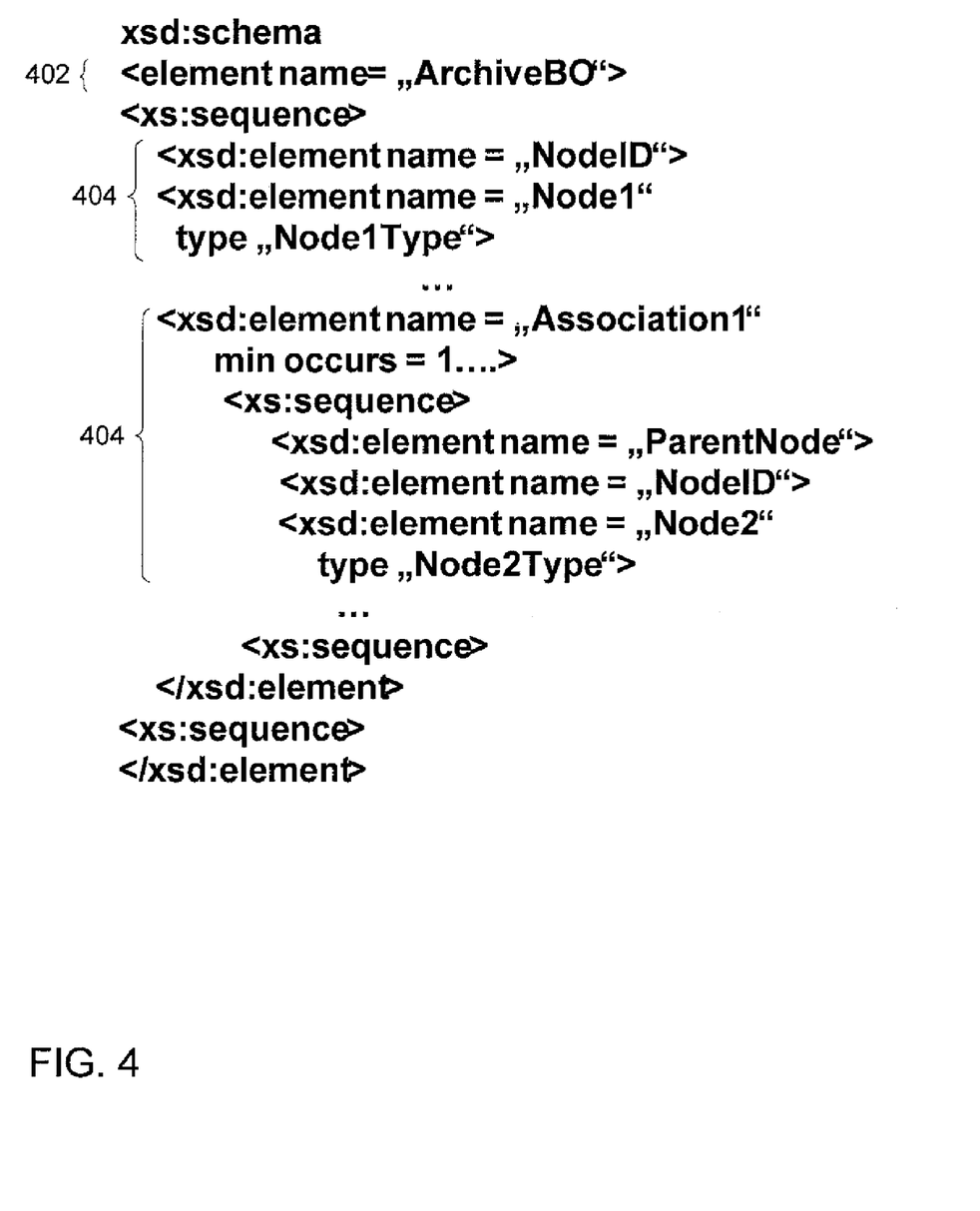
FIG. 4 is a diagram of a schema for a business object data type.

FIG. 3 is a diagram of a tree structure 302 representing a business object instance and an XML document 304 representing the business object instance. The business object instance includes a root node 306 with a root node identifier 10 and attribute values ABC. Dependent on the root node 306 are child nodes A1 308, A2 310, and A3 312, which are stored in the XML document 304 with a tree-structured hierarchy representing the hierarchy of nodes in the tree structure 302. The root node identifier and attributes of the root node are stored in the XML document 304. The child nodes A1 308, A2 310, and A3 312 are stored in the XML document 304 with a tree-structured hierarchy representing the hierarchy of nodes in the tree structure 302.

A relationship between the root node 306 and the child nodes A1 308, A2 310, and A3 312 determines the type of data that is generated in the XML document 304. The relationships with the root node 306 include the following. The child node A1 308 is related to the root node 306 being part of a composition of the business object instance, the child node A2 310 is related to the root node 306 by being a non-standalone dependent object, and the child node A3 312 is related to the root node 306 by being an inner BO cross BO node. As the child nodes A1 308 and A2 310 have relationships that indicate they are not part of a standalone business object, their attributes are included in the XML document 304. In particular, the child node A1 includes a node identifier 22 and attribute values DEF, and the node identifier 22 and the attribute values DEF are included in the XML document 304. As the node A3 312 is related to a standalone business object only its node name and node identifier 47 are stored in the XML document 304. To archive the node A3 312, the related standalone business object having a node with the node identifier 47 may be archived. When reconstructing the business object represented by the XML document 304, the business object having the node with the node identifier 47 may be reconstructed and a link between the business object represented by the XML document 304 and the node may be generated to reflect their relationship.

FIG. 4 is a diagram of a schema for a business object data type. The schema indicates the hierarchy of nodes and attributes of the business object as a hierarchy of XML elements. Information in the schema includes a name of a data type of a business object, identifiers of a root node, identifiers of associated nodes, and the like. In particular, the schema includes a name of the data type of a business object as "ArchiveBO" in a second line 402. In implementations, different names may indicate different data types. Fourth through sixth lines include an identification of a root node of the business object data type, and includes a node identifier and a data type of a node. Eighth through fourteenth lines indicate an associated, child node of the business object data type, which includes an identification that the node is an associated node, a cardinality for the node, an indication the node is a parent node (e.g., that it is parent node of a dependent business object), an identifier of the node, and a data type of the node.

The schema provides all information for retrieves and retrieve by association for compositions, where a retrieve may be a core service of business objects that provides an element structure of a requested node in response to an identification of a node (e.g., a name of a BO, the name of a node, and the node identifier), and a retrieve by association may return dependent data that results from a specified associated for a requested node, including compositions between two BO nodes of a same BO (e.g., parent-child relationship), composition between a BO node and corresponding text node, associations between two BO nodes of a same BO besides the parent-child relationship (e.g., an "Intra-BO-Association" across nodes in a hierarchy of a BO), associations between a host BO node and a root node of an included dependent object that is not a standalone object, and associations between two BO nodes of different BOs (e.g., "Cross-BO-Associations"). For retrieves by association on other associations may be resolved during a write phase of archive data and stored as an additional complex element. Should customers of an enterprise system enhance a BO node structure definition, enhancements may be automatically included in an archiving schema and archived together with the BO instance.

In general, an ESF may first call a BO implementation of an enterprise repository first (e.g., for a retrieve) and, if the call fails (e.g., because data is only available in an archive), an archive plug-in may be called, which may result in a return of BO data from an archive. For a consumer of BO data (e.g., an application that makes a retrieve call for a BO), there may be no difference between retrieval of data from an enterprise repository or archive such that calls to an archive plug-in may be seamless.

Figure 5:
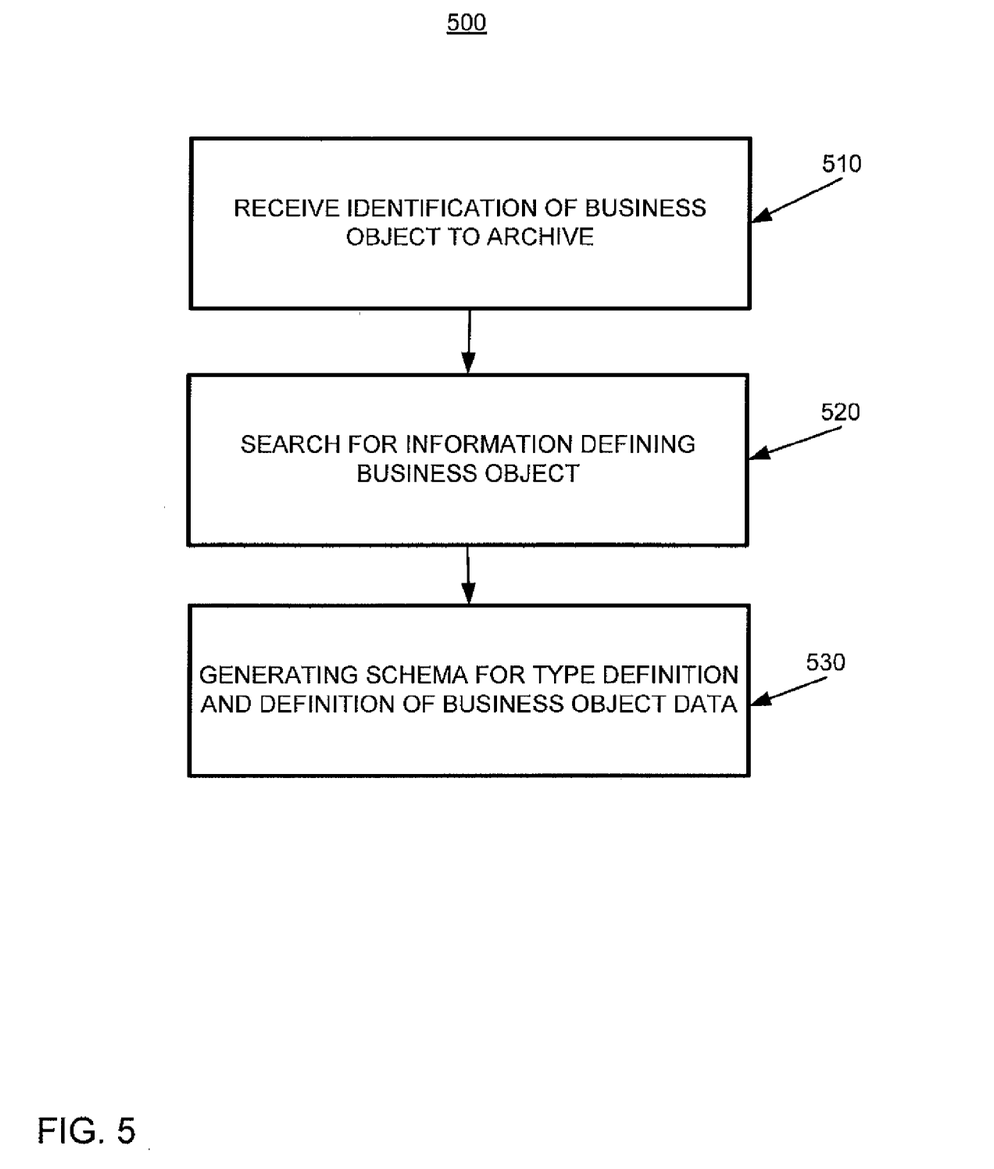
FIG. 5 is a flowchart of a process to archive business object data.

FIG. 5 is a flowchart of a process 500 to archive business object data. The process 500 may be implemented in the systems of FIGS. 1-2. For example, the process 500 may be performed by the archiving tool 110 of FIG. 1. In general, the process 500 includes receiving an identification of a business object to archive (510), searching for a type definition of the business object (520), and generating a schema for the type definition and a definition of the business object data (530).

An identification of a business object to archive is received (510). The identification may explicitly identify instances of a business object (e.g., by a root identifier) or may define instances of a business object by criteria (e.g., all SalesOrder business objects that have not been modified for more than two years). Receiving the identification may include receiving the identification through an API call to archive business objects or receiving a message (e.g., an application to application message) indicating business objects that are to be archived.

A search for information defining the business object is received (520). In general, each business object may be of a particular data type (e.g., SalesOrder, PurchaseOrder, and the like). Searching for information defining a business object may be performed by requesting type definitions of nodes of the business object and information defining relationships among nodes in the business object from an enterprise service repository, where definitions of data types may be stored.

A schema for the type definition and a definition of the business object data are generated (530). The definition of the business object is in accordance with the schema. If a schema has already been generated for the business object data (e.g., from an earlier archiving request), the schema might not be generated again. Generating the schema may include copying a type definition of a schema or transforming a type definition. The schema, definition of the business object, or both may be in accordance with a platform-independent file format including information reflecting the hierarchy of the business object, such as XML. In the schema hierarchy levels may reflect each hierarchy level of the business object, and each hierarchy level may have the respective attributes of the hierarchy level of the business object. Similarly, hierarchy levels of the instance data that is generated may reflect hierarchy levels of elements of business object instances. For nodes of a business object that are part of a stand-alone, referenced business object, information stored in a schema, instance data, or both may be reduced to information to identify the node and the stand-alone business object may be archived separately (or, e.g., the reference may be sufficient to identify either an archived or non-archived business object). In this manner, repetition of data may be reduced.

Although FIGS. 1-4 include a certain number and type of components, implementations may vary. For example, a format other than XML may be used for archiving data. As another example, although triggering of archiving is described as being initiated by an application that may include user-initiation, archiving may be triggered automatically (e.g., by a volume of data consumed). As another example a schema and instance data may be stored in a same document.

Similarly, although the process 500 of FIG. 5 includes a certain number and type of sub-processes, implementations may vary.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A method comprising:
   receiving, at an enterprise services framework including an archiver, an identification of an instance of a business object to archive;
   searching, based on the received identification, by the enterprise services framework including the archiver, for information defining the business object in an enterprise service repository, wherein the enterprise services framework searches for non-archived instances of business objects in a storage of business object instances and the archiver searches for archived instances of business objects; and
   based on the non-archived and archived instances of business objects that are retrieved during the searching, generating a schema for a definition of a data type of the business object and generating an instance of the business object in accordance with the generated schema, the schema being generated in accordance with a platform-independent file format comprising information reflecting a hierarchy of the business object;
   the generating the schema and the instance of the business object further comprising:
      generating hierarchy levels of the business object in the schema, wherein each hierarchy level, with the exception of hierarchy levels including references to standalone business objects, having respective attributes of the hierarchy level of the business object, wherein the format of the generating the hierarchy levels being the same for other business objects having the data type of the business object; and
      generating instance data to reflect the generated instance of the business object, the instance data being generated in accordance with the schema,
   wherein at least one of the receiving, the searching, and the generating the schema are implemented on at least one processor.

2. The method of claim 1, further comprising reconstructing the instance of the business object based on the instance data and the schema, wherein the identification is received at the archiver separate from a database including non-archived instances of business objects, wherein the enterprise services framework comprises at least one processor and at least one memory.

3. The method of claim 2, further comprising:
   performing a retrieve of associated nodes of the business object instance based on the reconstructed instance of the business object, the performing by a generic coded service for retrieving nodes of different data types.

4. The method of claim 1, wherein the schema and instance data are formatted in accordance with eXtensible Markup Language.

5. The method of claim 1 further comprising:
   receiving a request to archive additional business object instances having the data type as the instance represented by the instance data; and
   if the additional business object instances are of a new version of the business object instance, generating a new schema;
   otherwise, not generating a schema to accompany additional instance data.

6. The method of claim 1, wherein the generating the schema and the instance data comprises
   including a node identifier of a standalone business object but not attributes of the standalone business object if the standalone business object is an associated node of the business object.

7. The method of claim 1, wherein the generating the schema and the instance data comprises
   including attributes of non-standalone business objects in both the schema and the instance data.

8. The method of claim 1, wherein the information defining the business object comprises data type definitions of nodes of the business object and a definition of relationships among the nodes of the business object.

9. The method of claim 1, wherein the searching is performed by providing requests for the information defining the business object in accordance with a common language to define access to business objects through the enterprise services framework.

10. A computer program product, tangibly embodied on a non-transitory computer-readable medium, the product comprising instructions to cause a data processing apparatus to perform operations comprising:
    receiving, at an enterprise services framework including an archiver, an identification of an instance of a business object to archive;
    searching, based on the received identification, by the enterprise services framework including the archiver, for information defining the business object in an enterprise service repository, wherein the enterprise services framework searches for non-archived instances of business objects in a storage of business object instances and the archiver searches for archived instances of business objects; and
    based on the non-archived and archived instances of business objects that are retrieved during the searching, generating a schema for a definition of a data type of the business object and generating an instance of the business object in accordance with the generated schema, the schema being generated in accordance with a platform-independent file format comprising information reflecting a hierarchy of the business object;
    the generating the schema and the instance of the business object further comprising:
       generating hierarchy levels of the business object in the schema, wherein each hierarchy level, with the exception of hierarchy levels including references to standalone business objects, having respective attributes of the hierarchy level of the business object, wherein the format of the generating the hierarchy levels being the same for other business objects having the data type of the business object; and
       generating instance data to reflect the generated instance of the business object, the instance data being generated in accordance with the schema.

11. The product of claim 10, wherein the operations further comprise
    reconstructing the instance of the business object based on the instance data and the schema.

12. The product of claim 10, wherein the operations further comprise:
    performing a retrieve of associated nodes of the business object instance based on the reconstructed instance of the business object, the performing by a generic coded service for retrieving nodes of different data types.

13. The product of claim 10, wherein the schema and instance data are formatted in accordance with eXtensible Markup Language.

14. The product of claim 10, wherein the operations further comprise:
    receiving a request to archive additional business object instances having the data type as the instance represented by the instance data; and if the additional business object instances are of a new version of the business object instance, generating a new schema;

otherwise, not generating a schema to accompany additional instance data.

15. The product of claim 10, wherein the generating the schema and the instance data comprises including a node identifier of a standalone business object but not attributes of the standalone business object if the standalone business object is an associated node of the business object.

16. The product of claim 10, wherein the generating the schema and the instance data comprises including attributes of non-standalone business objects in both the schema and the instance data.

17. The product of claim 10, wherein the information defining the business object comprises data type definitions of nodes of the business object and a definition of relationships among the nodes of the business object.

18. The product of claim 10, wherein the searching is performed by providing requests for the information defining the business object in accordance with a common language to define access to business objects through the enterprise services framework.

* * * * *